Feb. 8, 1966 D. FIRTH 3,233,427
SHAFT COUPLING
Filed Oct. 1, 1962 4 Sheets-Sheet 3

INVENTOR.
DAVID FIRTH
BY Hobbs & Easton
ATTORNEYS

INVENTOR.
DAVID FIRTH
BY Hobbs & Euton
ATTORNEYS

United States Patent Office 3,233,427
Patented Feb. 8, 1966

3,233,427
SHAFT COUPLING
David Firth, South Bend, Ind., assignor to Dodge Manufacturing Corporation, Mishawaka, Ind., a corporation of Indiana
Filed Oct. 1, 1962, Ser. No. 227,374
5 Claims. (Cl. 64—11)

The present invention relates to shaft couplings and more particularly to a compound flexible shaft coupling.

An extensively used, conventional type coupling for connecting two rotatable shafts in end-to-end relationship consists of radially extending flanges on the adjacent ends of the two shafts and a flexible element of rubber or rubber-like material connecting the two flanges with the edges of the element being firmly clamped to the respective flange. This type of element operates satisfactorily for many applications and installations; however, under operating conditions involving high torque loads, whether of prolonged duration or of only momentary and instantaneous application, such as those encountered in starting while the driven shaft is under load, it has been necessary to employ relatively large couplings to handle the peak loads even though those loads constitute only a relatively short period of the overall operating time of the coupling. The increased size and weight of the coupling required for handling the peak loads render the coupling unsuited for installations in limited and confined operating space and areas, and unsatisfactory for high speed operations in which centrifugal force becomes an important factor. Other types of couplings of more compact design now available and adapted to give satisfactory performance under high speed operations and to meet all installation and service requirements are more complex and difficult to manufacture and install, and consequently generally more expensive, than the aforementioned conventional flexible couplings. It is therefore one of the principal objects of the present invention to provide a flexible coupling of the aforementioned general type having two cooperating flexible elements which, together, give optimum performance throughout the complete operating range, including normal light load operation and high torque load conditions, and which is of substantially the same size and weight as the conventional element capable of performing satisfactorily only at the normal or light load operations.

Another object of the present invention is to provide a compact and relatively simple compound flexible coupling in which two flexible elements operate both independently of and in conjunction with one another, and which is so constructed and designed that neither element will interfere with the normal operation of the other element.

Conventional elements of the aforementioned type may occasionally be subjected momentarily to sufficiently excessive torque loads to result in failure of or serious damage in the flexible element, thus requiring replacement of the element, together with causing losses resulting from the downtime of the machinery and the expenses in labor and parts in repairing the coupling. The present compound flexible coupling has incorporated therein a safety feature which prevents the excess loads, whether momentary or prolonged, from damaging the primary flexible element. A further object of the invention is therefore to provide a flexible coupling of this type in which the structure constituting the safety feature does not increase the overall size of the conventional element of this general type nor cause any substantial increase in the weight or complexity of the structure.

Still another object of the invention is to provide flexible couplings having two flexible elements, one of which performs alone during normal operating conditions, and the other of which performs in conjunction with the first under excess torque loads to provide the coupling with the required strength to handle the excess load and to prevent damage to the first element.

A further object is to provide a flexible coupling having a primary and a secondary flexible or yieldable element in which the secondary element effectively prolongs the life of the primary element and is adapted to perform efficiently alone for indefinite periods of time in the event the primary element fails from normal wear or damage resulting from adverse operating conditions, thereby permitting the machinery or equipment on which the coupling is used to continue to operate until the coupling can be repaired with a minimum of expense and inconvenience.

Additional objects and advantages of the present invention will become apparent from the following description and accompanying drawings, wherein.

Figure 1:
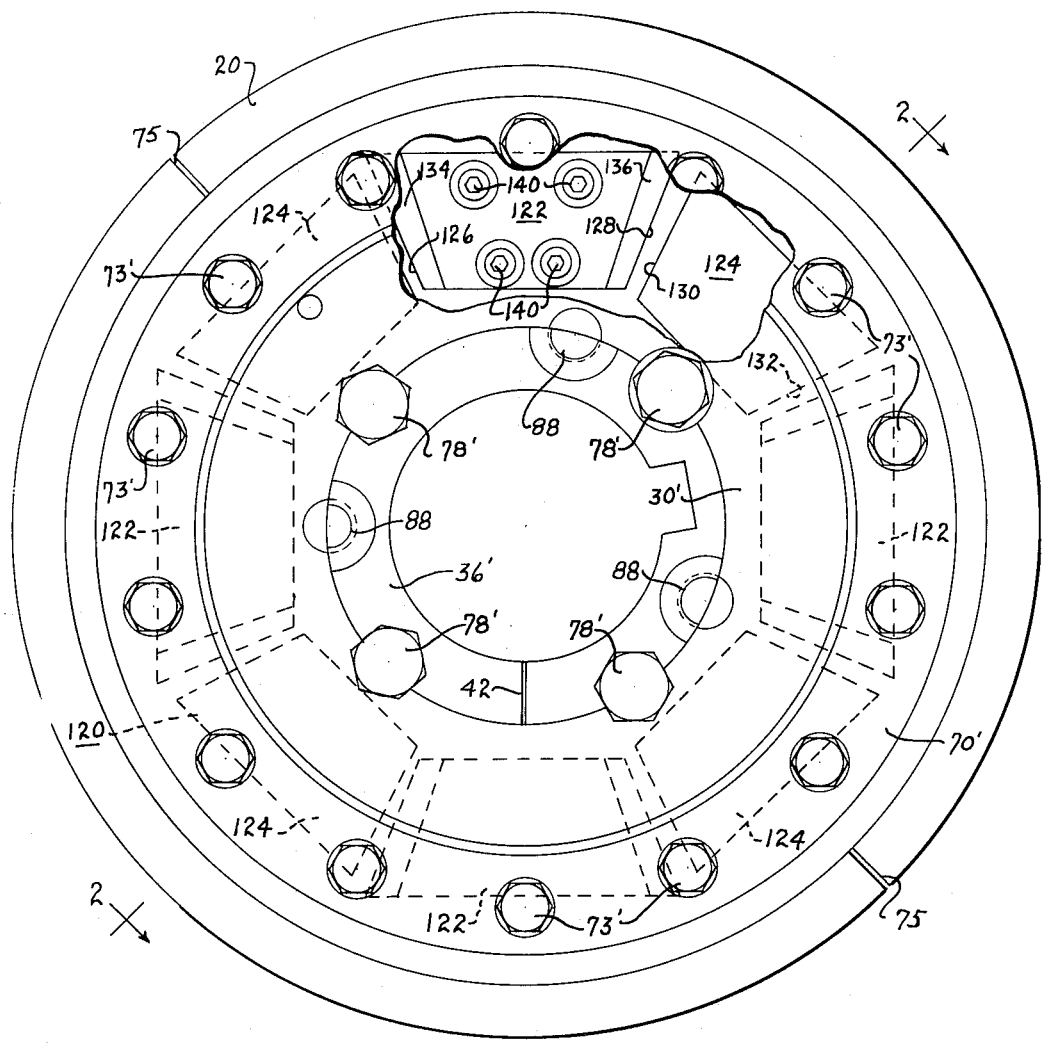
FIGURE 1 is a side elevational view of the shaft coupling embodying the present invention, a portion of the coupling being broken away to show more effectively the operating elements thereon.

With reference to the embodiment of the present invention illustrated in FIGURES 1 through 6, the coupling is shown mounted on driving shaft 12 and driven shaft 14 with flange assemblies 16 and 18 of the coupling being secured to the respective shafts and connected to one another by a flexible torsion element 20. The two shafts are in axial alignment and spaced from one another with driving shaft 12 being, for example, the shaft of an electric motor, internal combustion engine or similar power source, and driven shaft 14 being the power input or drive shaft of one of a number of different types of industrial and commercial machines or vehicles. The shafts shown in the drawings are of the same diameter and have conventional key-ways, although the present type of coupling can be readily adapted to driving and driven shafts of different diameters, straight or tapered, and with or without keys and key-ways.

The two flange assemblies are essentially the same in construction and may be used interchangeably on the driving and driven shafts of the proper diameter; consequently, only one of the flange assemblies will be described in detail herein and like numerals will be used on like parts in the two flange assemblies, the only distinction being in the use of primes with the numerals of the driven flange 18. Each flange assembly consists of a solid annular-shaped hub 30 having an internal tapered surface 32 and an annular shoulder 34 extending radially outwardly at the inner peripheral edge of the flange. Between the hub 30 and the shaft is a split bushing 36 of substantially the same length as the hub, having an external surface 38 tapered to corrspond to the taper on the internal surface 32 on hub 30, and having an internal annular surface 40 parallel with the shaft. The bushing is continuous circumferentially with the exception of a slot 42 of sufficient width to permit the bushing to be contracted during installation to grip the shaft firmly. Tapered surfaces 32 and 38 of the hub and bushing are assembled in face-to-face contact and are adapted to slide relative to one another as the flanges are assembled on a shaft in the manner to be described fully hereinafter.

The flexible torsion member 20 consists of an annular body section 60 of arcuate cross section joined to inwardly extending side walls 62 and 62' which terminate at their inner edges in outwardly extending flanges or beads 66 and 66', respectively. The torsion member is preferably pre-formed to the general configuration shown in FIGURES 1 and 2 and is constructed of rubber or rubber-like synthetic material having a plurality of layers of fabric or nylon cord or other suitable material embedded in body section 60 and side walls 62 and 62', and the beads 66 and 66' preferably having relatively hard annular cores around which the ends of fabric are wrapped. The two side walls 62 and 62' engage the external walls of shoulders 34 and 34', respectively, and annular surfaces 68 and 68', and are held firmly in contact with these parts by rings 70 and 70', seated in annular slots 72 and 72' and retained in place by a plurality of collar or machine screws 73 and 73'. The rings are provided with inwardly projecting annular ribs 74 and 74' for engaging and effectively gripping the element side walls. While member 20 may be circumferentially continuous, it is preferably split with one or more transverse slots 75, dividing the member into separate segments, in order to facilitate assembling the member on shoulders 34 and 34', both during the initial installation and in the replacement of a new element for a worn or damaged element.

Bushing 36 is contracted into firm engagement with the shaft on which the flange assembly is mounted by screws 78, each screw being seated in a bore 80, one longitudinal portion 82 of which is formed in the internal surface 32 of hub 30, and the other portion 84 of which is formed in the external surface 38 of bushing 36. The type of securing means employed herein for contracting the bushing, and several modified forms thereof, are fully disclosed and claimed in my U.S. Patent No. 2,402,743, dated June 25, 1946, and hence the requirements of this general type will not be described in detail herein. Bore 80 intersects contacting surfaces 32 and 38 of the hub and bushing, respectively, preferably approximately equally near the longitudinal center of the bore. Portion 82 of the bore contains screw threads corresponding to those of the screw 78, and portion 84 is smooth but of a radius of sufficient size to permit the screw to rotate freely in the threads of portion 82 without becoming disengaged therefrom. The length of bore portion 84 is such that the forward end of the screw will readily seat on the inner end of said portion as the screw is tightened. Thereafter, further tightening of the screw forces the bushing inwardly relative to the hub and urges tapered surface 38 against and a long tapered surface 32, causing the bushing to contract and adhere firmly and rigidly to the shaft.

In order to facilitate disassembly of the present coupling, either for its removal from the shafts or for replacement of torsion member 20, bores 88 similar to bore 80 are provided in adjacent surfaces of hub 30 and bushing 36. In bores 88, however, the portion in the bushing is threaded and the wall of the portion in the hub is smooth and shorter than the portion in the hub, and is of sufficient radius to permit the screw to rotate freely therein without becoming disengaged from the screw threads of the threaded portion. Insertion and tightening of a screw in bore 88 after screws 78 have been loosened and possibly removed, forces the hub inwardly endwise relative to the bushing, thereby permitting the bushing to expand and release the shaft. While, as seen in the drawings, flange assembly 16 is an internal type, i.e., screws 78 are inserted therein from the internal side of the flange assembly, and flange assembly 18 is an external type, the two flanges may both be external types similar to flange assembly 18.

Figure 7:
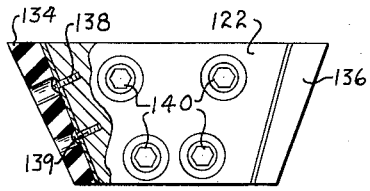
FIGURE 7 is a partial cross sectional view of a modified form of one of the elements of the coupling.
Figure 5:
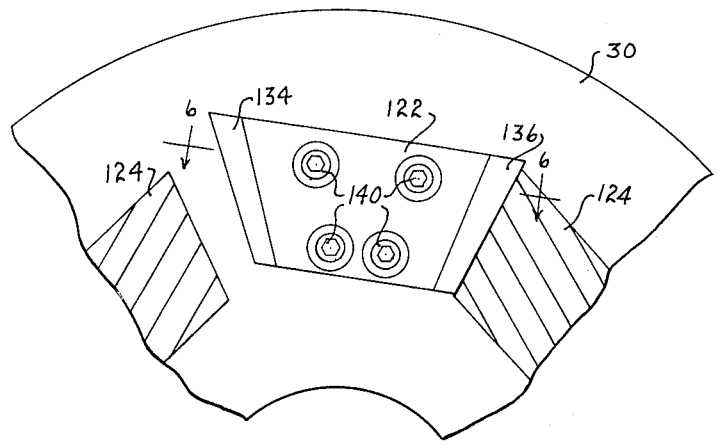
FIGURE 5 is a vertical cross sectional view through the coupling shown in the preceding figures, the section being taken on line 5—5 of FIGURE 4, illustrating the same operating position as shown in the latter figure.

In the present coupling, a secondary flexible element 120 is incorporated for use in conjunction with primary flexible element 20, the secondary element consisting of a plurality of lugs 122 and 124 arranged alternately in interlocking relationship on the internal faces of flanges 16 and 18, respectively, the lugs being equally spaced from one another and from the center of the flanges. The edges 126 and 128 of lugs 122 and the edges 130 and 132 of lugs 124 are on radii of the flanges so that the adjacent edges of the two lugs will come into face-to-face contact whenever the flanges are rotated relative to one another in one direction or the other during peak torque loads on the coupling. The secondary element 120 is a resilient or yieldable type, the resiliency being provided by relatively wide rubber bumper members 134 and 136 on opposite edges of lugs 122. The rubber bumper members 134 and 136 on lugs 122 are firmly bonded to the edges of the metal portion of the lug or otherwise secured to the metal portion, as illustrated in FIGURE 7, in which screws 138 and 139 are used as the securing means, and the bumper members may be of varying degrees of resiliency from one coupling to another to provide the desired flexible characteristics in the element 122. Lugs 124 are not shown with rubber bumper members; however, if desired, edges 130 and 132 may likewise be provided with such members, and in some installations only one rubber bumper 134 or 136 may be used on lugs 122. Lugs 122 are secured to the inner face of hub 30 of flange 16 by a plurality of screws 140 extending inwardly through the lug and threadedly received in holes in the hub, and lugs 124 may likewise be mounted on the inner face of hub 30' by similar screws 140; however, these lugs are preferably formed integrally with the hub, as shown in the embodiment of the drawings. Lugs 122, being removable by removing screws 140, may be readily replaced whenever it is necessary to do so as a result of excessive wear of the bumper members 134 and 136.

Figure 2:
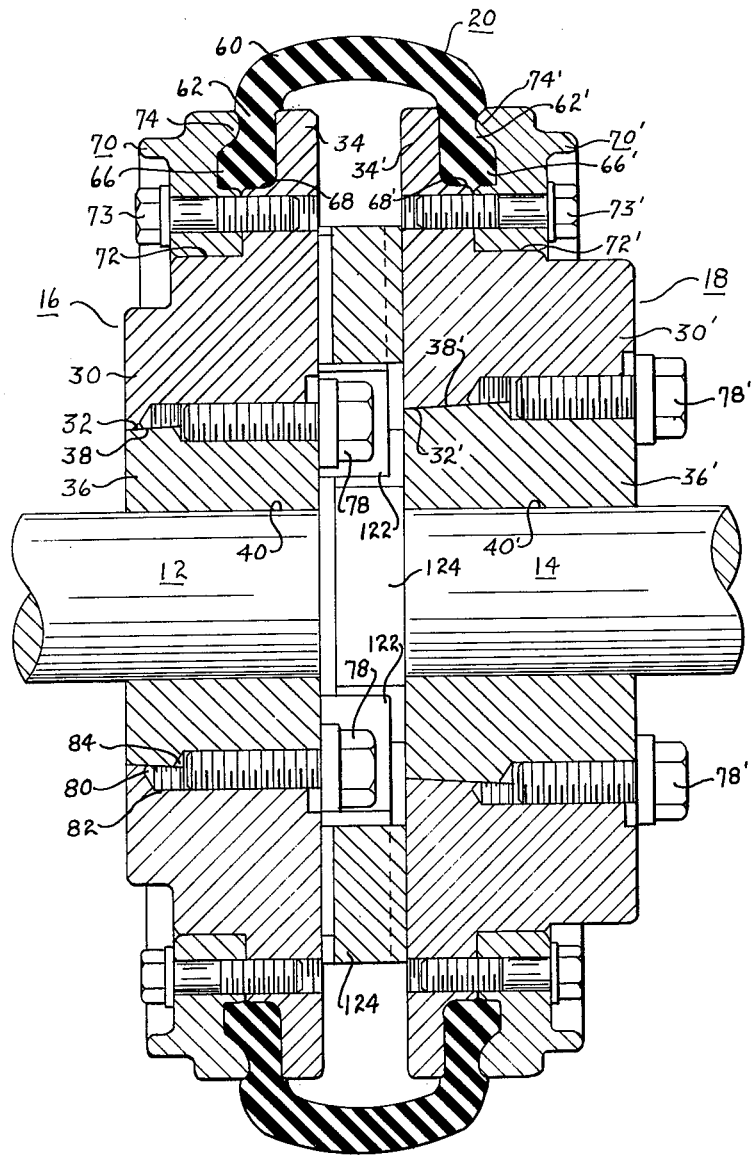
FIGURE 2 is a vertical cross sectional view of the shaft coupling shown in FIGURE 1, the section being taken on line 2—2 of the latter figure.
Figure 3:
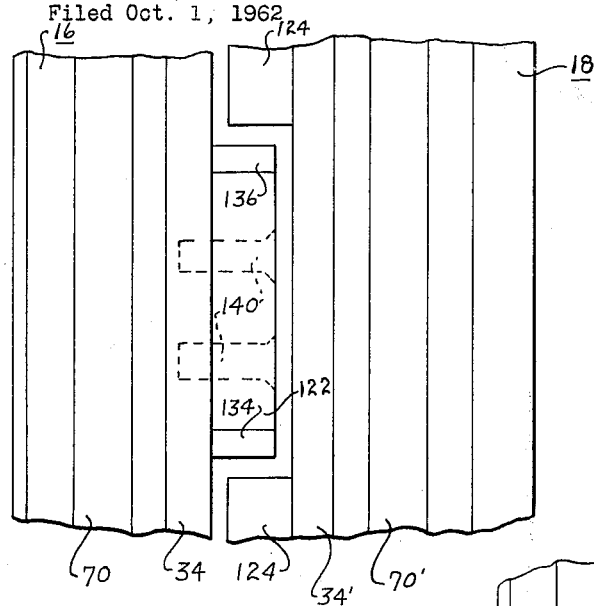
FIGURE 3 is a fragmentary plan view of the coupling shown in FIGURES 1 and 2 with the external flexible element removed to better show the internal structure of the coupling, the coupling being shown in one operating position.
Figure 4:
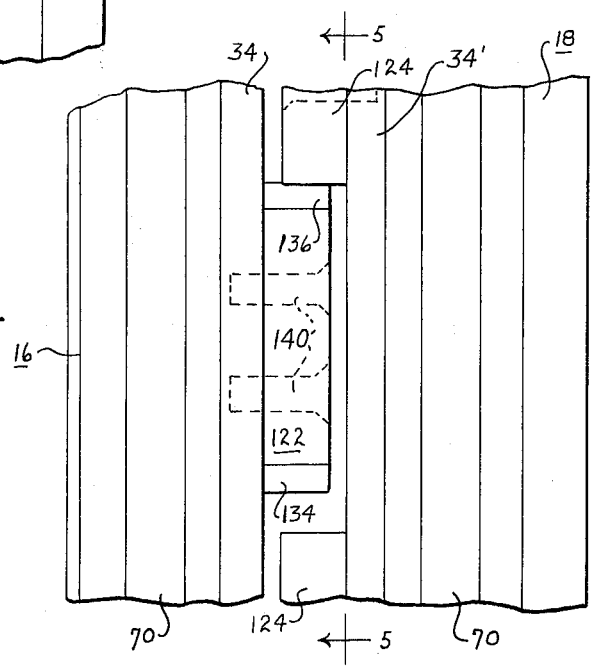
FIGURE 4 is a fragmentary plan view of the coupling similar to the view of FIGURE 3 with the external flexible element removed to better show the internal structure of the coupling, the coupling being shown in another operating position.
Figure 6:
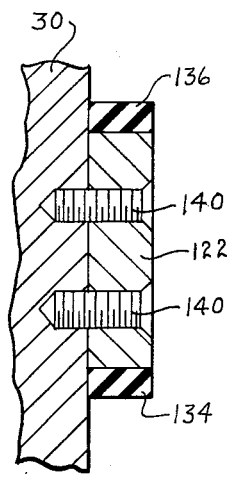
FIGURE 6 is a cross sectional view through one of the elements of the present coupling, the section being taken on line 6—6 of FIGURE 5.

In the operation of the present compound flexible coupling after it has been mounted on shafts 12 and 14, as illustrated in FIGURE 2, element 20 carries the normal load being transmitted between the driving shaft 12 and driven shaft 14, and lugs 122 and 124 of the secondary element 120 remain in spaced relation to one another as illustrated in FIGURE 1. Although the spacing between the elements may vary from time to time during this normal operation, as a result of increased or decreased load on the coupling, they do not contact one another until the torque reaches a predetermined value. In the event excess torque is placed on the coupling element 20, the coupling yields sufficiently to cause lugs 122 to engage lugs 124 with the respective rubber bumper member of lug 124. This contacting relationship remains until the torque load on the coupling has been reduced sufficiently to permit primary element 20 to carry the full load on the coupling; thereupon, the two lugs 122 and 124 separate and return to their spaced relationship shown in FIGURE 1. The load on the coupling may shift from the primary coupling to the secondary coupling from time to time throughout the operation of the coupling, and will usually do so during the starting operation of the machinery.

While the secondary element 120 prevents overloading of primary element 20 throughout the entire operating range of the coupling, normal wear of the element 20 will result in its failure during the operation of the coupling. When this occurs, secondary element 120 becomes effective to continue the operation of the coupling for an indefinite period of time, until the worn primary element 20 has been replaced with a new element. Since the primary element is not subjected to excess torque loads as a result of the upper limit provided by the secondary element 120, the life of the primary element is greatly extended over such elements used in conventional shaft couplings of this type.

Figure 8:
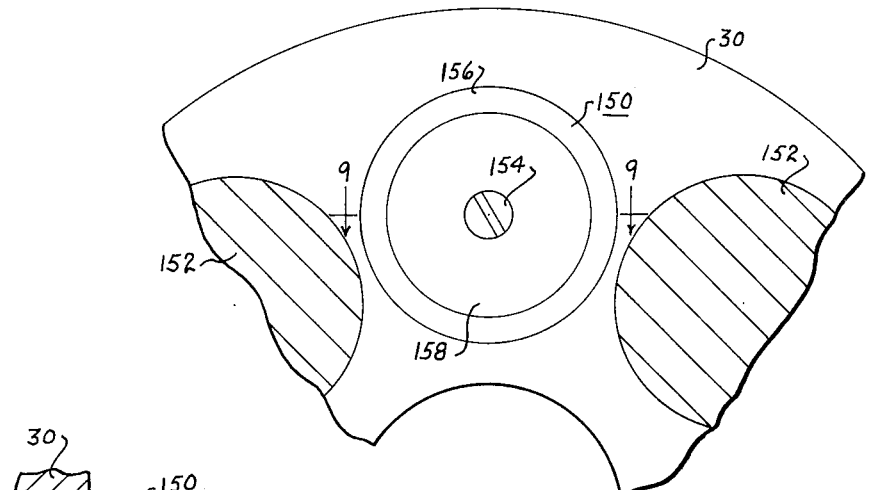
FIGURE 8 is a fragmentary cross sectional view similar to that shown in FIGURE 5, illustrating a modified form of the present invention.
Figure 9:
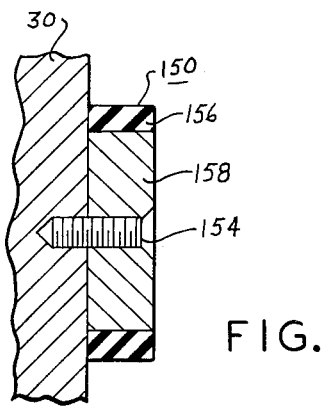
FIGURE 9 is a fragmentary cross sectional view through a portion of the structure shown in FIGURE 8, the section being taken on line 9—9 of the latter figure.

A modified form of the present invention is illustrated in FIGURES 8 and 9, in which the lugs, instead of being frusto-conically shaped as in the embodiment previously described, are disc-shaped. These lugs 150 and 152 are positioned alternately around the inner faces of hubs 30 and 30', each lug 150 being secured to hub 30 by a single screw 154 extending therethrough into a threaded hole in the hub, and lugs 152 preferably being formed integrally with hub 30'. The lug 150 is provided with an annular rubber bumper member 156 bonded to the periphery of the internal metal disc or hub portion 158. One advantage of this type of secondary element is its adjustability to present different wearing surfaces on the rubber bumper member 156 as contact points on the periphery thereof become excessively worn during the operation of the coupling. Further, this type of lug 150 can be readily replaced by removing merely the single screw 154. While lugs 152 are preferably formed integrally with hub 30', they may likewise be secured to the inner face of the hub as separate elements using screws similar to screw 154. The operation of the coupling embodying the modified form illustrated in FIGURES 8 and 9 is the same as the operation of the previously described embodiment of the invention.

Although only two forms of the present compound flexible element have been described in detail herein, various other modifications and changes may be made to satisfy requirements without departing from the scope of the invention.

I claim:

1. A compound flexible coupling for connecting two shafts in end-to-end relationship, comprising flanges for said shafts having inner faces on radial planes, each flange having a split bushing with a tapered surface, a hub surrounding said bushing and having a tapered surface in face-to-face contact with the surface on said bushing, means for urging said surfaces together to contract said bushing about the shaft on which the flange is mounted, an annular peripheral shoulder on said flange, an annular flexible element having side wills embracing said annular shoulders and extending continuously between said flanges, a ring seating against the external side of said walls, a plurality of screws securing said rings to the respective shoulder in clamping relationship with said side walls, a plurality of frusto-conically shaped equally spaced lugs on the inner face of one of said hubs, said lugs being spaced equally from one another and from the center of said hub, screws retaining said lugs rigidly on said face, a rubber bumper member on each of said lugs, and a plurality of frusto-conically shaped equally spaced lugs disposed on the inner face of the other of said hubs and spaced equally from one another and from the center of said hub, said second mentioned lugs being in close proximity to and in interlocking relationship with said first mentioned lugs and normally spaced therefrom, and said first and second mentioned lugs being so spaced that they contact one another within the normal operating limits of said flexible element.

2. A compound flexible coupling for connecting two shafts in end-to-end relatioship, comprising flanges for said shafts having inner faces on radial planes, each flange having a split bushing with a tapered surface, a hub surrounding said bushing and having a tapered surface in face-to-face contact with the surface on said bushing, means for urging said surfaces together to contract said bushing about the shaft on which the flange is mounted, an annular flexible element connecting said flanges at the periphery thereof and being continuous therebetween, a plurality of frusto-conically shaped equally spaced lugs on the inner face of said hubs, said lugs being spaced equally from one another and from the center of said hub, screws retaining said lugs rigidly on said face, a resilient bumper member on each of said lugs, and a plurality of frusto-conically shaped equally spaced lugs disposed on the inner face of the other of said hubs and spaced equally from one another and from the center of said hub, said second mentioned lugs being in close proximity to and in interlocking relationship with said first mentioned lugs and normally spaced therefrom, and said first and second mentioned lugs being so spaced that they contact one another within the normal operating limits of said flexible element.

3. A compound flexible coupling for connecting two shafts in end-to-end relationship, comprising flanges for said shafts having inner faces on radial planes and peripheral annular shoulders, an annular flexible element having side walls embracing said annular shoulders and extending continuously between said flanges, a ring seating against the external side of said walls, means securing said rings to the respective shoulder in clamping relationship with said side walls, a plurality of equally spaced lugs disposed on the inner face of one of said flanges, and a plurality of equally spaced lugs disposed on the inner face of the other of said flanges and arranged in interlocking relationship with said first mentioned lugs and normally spaced therefrom, said first mentioned lugs having rubber bumper members thereon for engaging the second mentioned lugs, and said first and second mentioned lugs being so spaced that they contact one another within the normal operating limits of said flexible element.

4. A compound flexible coupling for connecting two shafts in end-to-end relationship, comprising flanges for said shafts having inner faces on radial planes and in spaced relation, an annular flexible element connecting said flanges and being continuously therebetween, a plurality of disc-shaped lugs on the inner face of one of said flanges, said lugs being spaced equally from one another and from the center of said flange, screws retaining said lugs rigidly on said face, a resilient bumper member on the periphery of said lugs, and a plurality of disc-shaped lugs disposed on the inner face of the other of said flanges and spaced equally from one another and from the center of said flange, said second mentioned lugs being it close proximity to and in interlocking relationship with said first mentioned lugs and normally spaced therefrom.

5. A compound flexible coupling for connecting two shafts in end-to-end relationship, comprising flanges for said shafts having inner faces, an annular flexible element connecting said flanges and being continuous therebetween, a plurality of disc-shaped lugs disposed on the inner face of one of said flanges, and a plurality of disc-shaped lugs disposed on the inner face of the other of said flanges and arranged in close proximity to and in interlocking relationship with said first mentioned lugs and normally spaced therefrom, said first mentioned lugs having rubber bumper members thereon for engaging the second mentioned lugs.

References Cited by the Examiner

UNITED STATES PATENTS

| | | | |
|---|---|---|---|
| 1,656,715 | 1/1928 | Weiland | 64—11 |
| 2,742,769 | 4/1956 | Gleeson et al. | 64—13 |
| 2,840,998 | 7/1958 | Reich | 64—11 |
| 2,869,340 | 1/1959 | Saberton | 64—14 |
| 2,901,896 | 9/1959 | Reich | 64—11 |
| 2,902,842 | 9/1959 | Byron | 64—14 |
| 3,020,737 | 2/1962 | Firth | 64—11 |
| 3,023,593 | 3/1962 | Nallinger | 64—11 |
| 3,046,759 | 7/1962 | De Ford et al. | 64—11 |

FOREIGN PATENTS

| | | |
|---|---|---|
| 1,248,272 | 10/1960 | France. |
| 660,305 | 5/1938 | Germany. |

BROUGHTON G. DURHAM, *Primary Examiner.*

ROBERT C. RIORDON, *Examiner.*